(12) United States Patent
Suzuki

(10) Patent No.: US 8,678,280 B2
(45) Date of Patent: Mar. 25, 2014

(54) CODE READING APPARATUS, PORTABLE TERMINAL, AND COMMODITY INFORMATION PROCESSING SYSTEM

(75) Inventor: Kazufumi Suzuki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 322 days.

(21) Appl. No.: 13/216,415

(22) Filed: Aug. 24, 2011

(65) Prior Publication Data

US 2012/0048925 A1 Mar. 1, 2012

(30) Foreign Application Priority Data

Aug. 26, 2010 (JP) ................................ 2010-189752
Jun. 28, 2011 (JP) ................................ 2011-143216

(51) Int. Cl.
*G06K 7/14* (2006.01)

(52) U.S. Cl.
USPC ...... 235/383; 235/380; 235/462.11; 235/437; 705/16; 705/24

(58) Field of Classification Search
USPC .......... 235/383, 380, 462.11, 437; 705/16, 24
See application file for complete search history.

(56) References Cited

U.S. PATENT DOCUMENTS

| | | | |
|---|---|---|---|
| 5,107,100 A | | 4/1992 | Shepard et al. |
| 5,900,609 A | * | 5/1999 | Kikuchi et al. ............... 235/383 |
| 6,364,209 B1 | | 4/2002 | Tatsuta et al. |
| 7,503,492 B2 | | 3/2009 | Matushima et al. |
| 7,784,684 B2 | * | 8/2010 | Labrou et al. ................. 235/380 |
| 8,328,094 B2 | * | 12/2012 | Proud et al. .................... 235/383 |
| 2005/0211771 A1 | * | 9/2005 | Onozu .......................... 235/383 |
| 2008/0011838 A1 | * | 1/2008 | Henry ........................... 235/383 |

FOREIGN PATENT DOCUMENTS

| | | |
|---|---|---|
| JP | 2000-235617 | 8/2000 |
| JP | 2004-102423 | 4/2004 |
| JP | 2005-084890 | 3/2005 |
| JP | 2006-134160 | 5/2006 |
| JP | 2006-178561 | 7/2006 |
| JP | 2007-328672 | 12/2007 |
| JP | 2009-225251 | 10/2009 |

OTHER PUBLICATIONS

Japanese Office Action for Japanese Application No. 2011-143216 mailed on Aug. 14, 2012.

* cited by examiner

*Primary Examiner* — Allyson Trail
(74) *Attorney, Agent, or Firm* — Amin, Turocy & Watson, LLP

(57) ABSTRACT

According to one embodiment, a code reading apparatus includes an image pickup section, a detecting section, a size recognizing section, and a reading section. The image pickup section picks up an image. The detecting section detects, from the picked-up image, a two-dimensional code obtained by converting information concerning a transaction of a commodity. The size recognizing section recognizes the size of the detected two-dimensional code. The reading section reads the information from the detected two-dimensional code if the recognized size of the two-dimensional code is different from the size of a two-dimensional code recognized immediately before the recognition of the size of the two-dimensional code in the same transaction processing.

9 Claims, 10 Drawing Sheets

CODE READING APPARATUS, PORTABLE TERMINAL, AND COMMODITY INFORMATION PROCESSING SYSTEM

CROSS-REFERENCE TO RELATED APPLICATIONS

This application is based upon and claims the benefit of priority from the prior Japanese Patent Applications No. 2011-143216, filed on Jun. 28, 2011 and No. 2010-189752, filed on Aug. 26, 2010; the entire contents of all of which are incorporated herein by reference.

FILED

Embodiments described herein relate generally to a code reading apparatus, a portable terminal, a commodity information processing system.

BACKGROUND

In the past, as a commodity information processing system for a store such as a supermarket, there is a commodity information processing system that integrates a pre-handling system in a checkout system including a POS (Point Of Sales) terminal. The pre-handling system registers a commodity with a portable terminal carried by a store clerk according to the operation by the store clerk before checkout processing by the POS terminal set in a checkout area of a store. Subsequently, the pre-handling system issues, with a printer, a provisional receipt on which a two-dimensional code obtained by encoding information concerning a transaction of the commodity registered by the portable terminal such as commodity information of the commodity is printed. The pre-handling system reads a barcode affixed to the commodity with a scanner included in the portable terminal. Subsequently, the pre-handling system reads commodity information incorporated in the read barcode to thereby perform registration of the commodity.

A customer passes the provisional receipt issued by the pre-handling system to a casher in a checkout place of the store. The casher causes a scanner connected to the POS terminal to read the two-dimensional code printed on the provisional receipt. The POS terminal executes checkout processing on the basis of data incorporated in the two-dimensional code read by the scanner.

As explained above, the pre-handling system registers a commodity with the portable terminal operated by the store clerk before checkout processing in the POS terminal. Consequently, while checkout in the POS terminal for a certain customer is performed, a commodity of another customer can be registered by the portable terminal. Therefore, there is an advantage that it is possible to efficiently perform checkout and reduce checkout time.

In general, since a printing sheet used as the provisional receipt is narrow roll paper, a two-dimensional code having a large size cannot be printed on the printing sheet. Therefore, in the pre-handling system in the past, if an information amount of information concerning a transaction of a commodity such as commodity information of a transaction target commodity is large, the information is divided into plural two-dimensional codes and encoded. In the pre-handling system in the past, the plural two-dimensional codes are printed on the provisional receipt. If the plural two-dimensional codes are printed on the provisional receipt, in checkout in the POS terminal, in a process of causing the scanner to read the plural two-dimensional codes, the casher causes the scanner to read one two-dimensional code twice by mistake.

DETAILED DESCRIPTION

In general, according to one embodiment, a code reading apparatus includes an image pickup section, a detecting section, a size recognizing section, and a reading section. The image pickup section picks up an image. The detecting section detects, from the picked-up image, a two-dimensional code obtained by converting information concerning a transaction of a commodity. The size recognizing section recognizes the size of the detected two-dimensional code. The reading section reads the information from the detected two-dimensional code if the recognized size of the two-dimensional code is different from the size of a two-dimensional code recognized immediately before the recognition of the size of the two-dimensional code in the same transaction processing.

Figure 1:
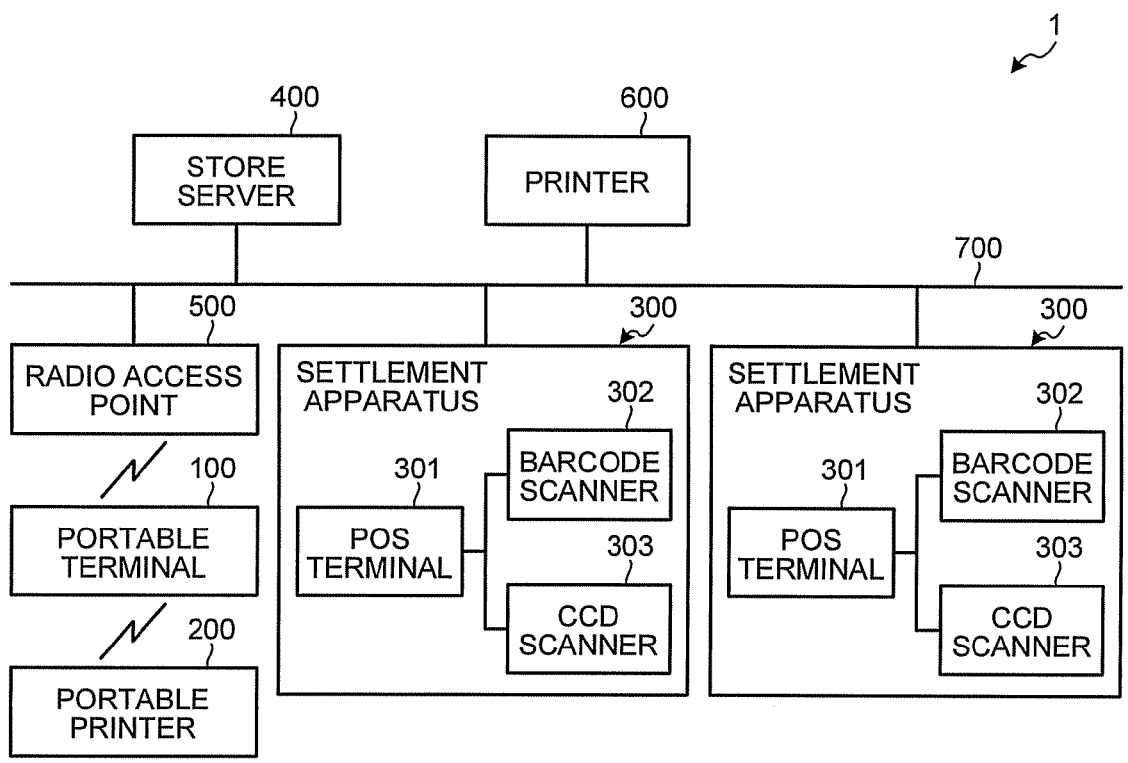
FIG. 1 is a diagram of a schematic configuration of a commodity information processing system according to an embodiment.

FIG. 1 is a diagram of a schematic configuration of a commodity information processing system according to an embodiment. As shown in FIG. 1, a commodity information processing system 1 includes a portable terminal 100, a portable printer 200 functioning as a medium issuing section, a settlement apparatus 300, a store server 400, a radio access point 500, and a printer 600. In this embodiment, in the commodity information processing system 1, the settlement apparatus 300, the store server 400, the radio access point 500, and the printer 600 are connected by a wired communication network 700 such as a wired LAN (Local Area Network). The portable terminal 100 is connected to the radio access point 500 and the portable printer 200 by radio communication. In this embodiment, the portable terminal 100, the portable printer 200, and the store server 400 configure a pre-handling system.

The commodity information processing system 1 according to this embodiment is a pre-handling system set in a store that performs pre-handling. The commodity information processing system 1 according to this embodiment registers, with the portable terminal 100 operated by a store clerk, the transaction target commodity of a customer, who waits for settlement, before settlement of a transaction target commodity in the settlement apparatus 300. Subsequently, the commodity information processing system 1 issues, with the portable printer 200, a provisional receipt 800 (see FIG. 10) on which information concerning the registered commodity is displayed. In the settlement, the customer passes the provisional receipt 800 to a casher. The casher who receives the provisional receipt 800 performs operation for inputting the information concerning the commodity displayed on the provisional receipt 800 to the settlement apparatus 300. Consequently, the settlement apparatus 300 performs the settlement of the commodity.

Details of the sections of the commodity information processing system 1 are explained below.

Figure 2:
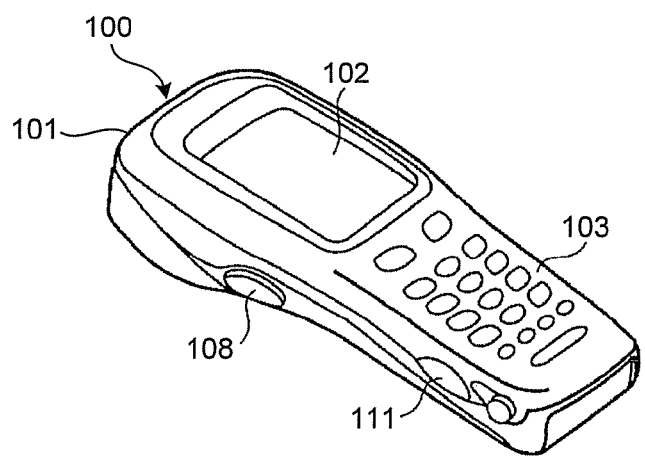
FIG. 2 is a perspective view of a portable terminal viewed from the front side.
Figure 3:
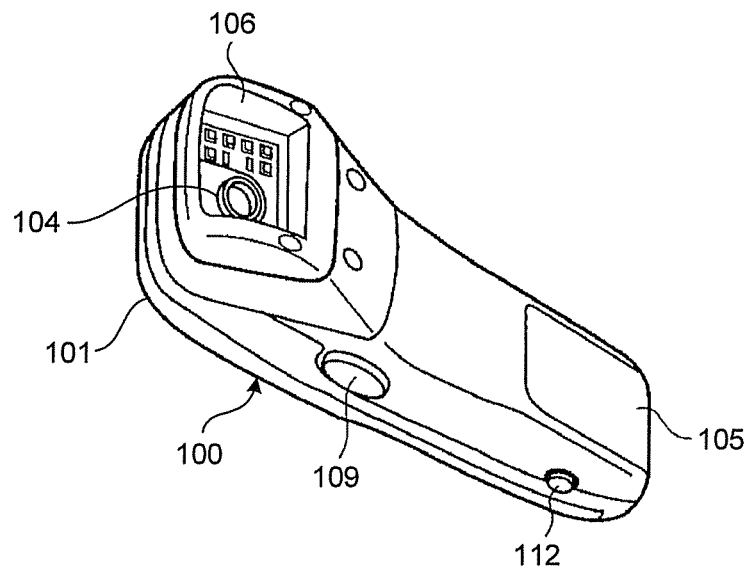
FIG. 3 is a perspective view of the portable terminal viewed from the rear side.
Figure 4:
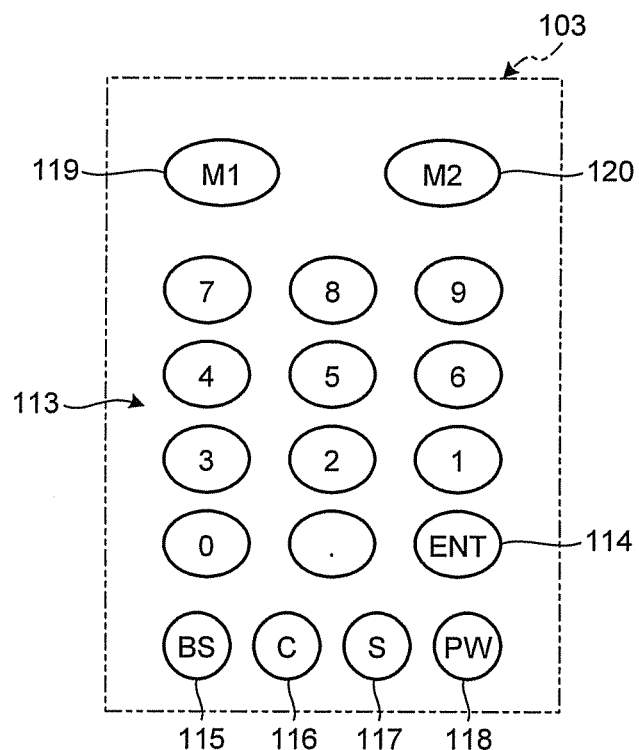
FIG. 4 is a plan view of a key section of the portable terminal.
Figures 5, 6:
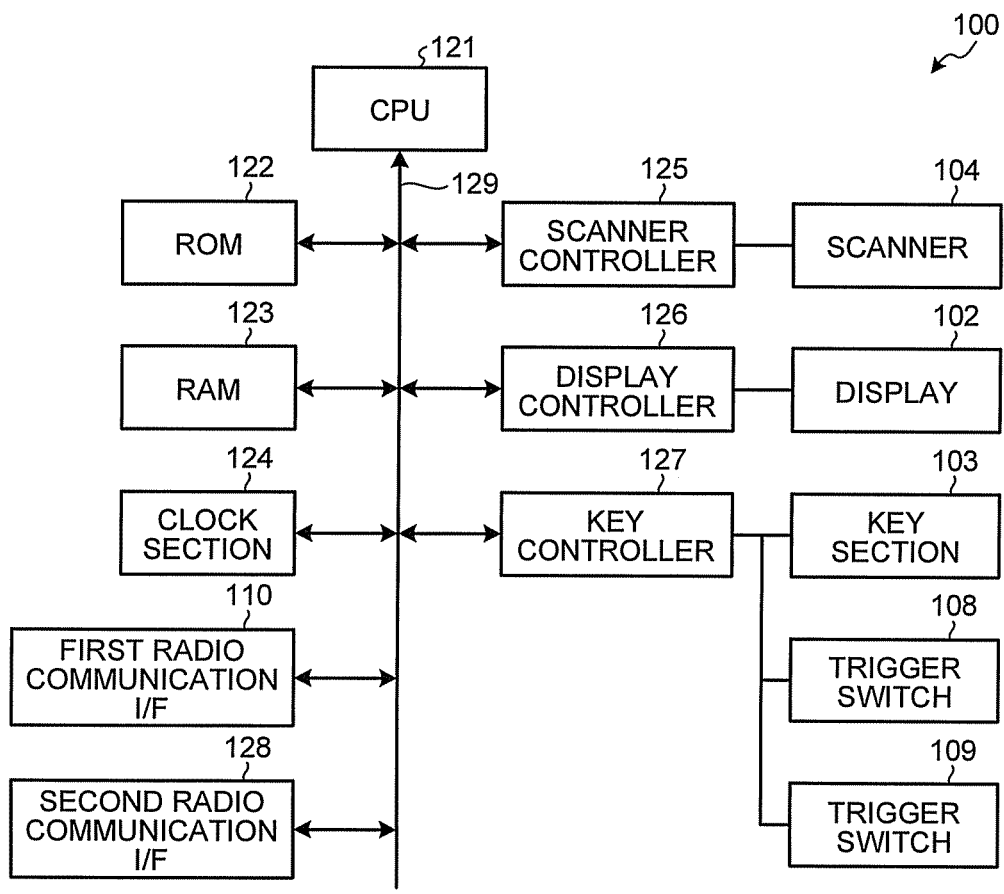
FIG. 5 is a diagram of a schematic configuration of the portable terminal.
FIG. 6 is an explanatory diagram for explaining a commodity information storage area formed in a RAM of the portable terminal.

First, details of the portable terminal 100 are explained with reference to FIGS. 2 to 6. FIG. 2 is a perspective view of the portable terminal viewed from the front side. FIG. 3 is a perspective view of the portable terminal viewed from the rear side. FIG. 4 is a plan view of a key section of the portable terminal. FIG. 5 is a diagram of a schematic configuration of the portable terminal. FIG. 6 is an explanatory diagram for explaining a commodity information storage area formed in a RAM of the portable terminal.

The portable terminal 100 is an information processing terminal of a portable type operated by a store clerk or the like of a store. As shown in FIGS. 2 and 3, the external shape of the portable terminal 100 is a substantially rectangular parallelepiped. The store clerk who carries the portable terminal 100 can operate the portable terminal 100 with one hand. The portable terminal 100 includes a display 102 such as a liquid crystal display and a key section 103 in the front of a housing 101. The portable terminal 100 includes a scanner 104 and a battery 105 on the back of the housing 101. The portable terminal 100 also includes a code reading opening 106 of the scanner 104 on the back of the housing 101. The portable terminal 100 includes trigger switches 108 and 109 substantially in the centers of both left and right sides of the housing 101. The trigger switches 108 and 109 function as a trigger in reading a code symbol such as a barcode with the scanner 104. The portable terminal 100 includes a light projecting and receiving window 111 of a first radio communication interface 110 (see FIG. 5) in a lower part on the left side of the housing 101.

The portable terminal 100 includes the battery 105 detachably inserted in a lower part on the back of the hosing 101. The store clerk who operates the portable terminal 100 can detach the battery 105 from the housing 101 by operating a release switch 112 provided in a lower part on the right side of the housing 101. The portable terminal 100 operates with electric power of the battery 105.

The key section 103 includes, as shown in FIG. 4, a ten key 113 including number keys of "0" to "9" and a decimal point key, an enter key 114, a backspace key 115, a clear key 116, a shift key 117, a power key 118, a first magic key 119, and a second magic key 120.

The scanner 104 optically reads commodity information indicating a commodity such as a commodity code from a barcode affixed to a transaction target commodity. A commodity has, as commodity information indicating the commodity, a commodity code set in advance for each commodity. In a store where the commodity information processing system 1 according to this embodiment is installed, barcodes incorporating commodity codes are affixed to commodities. In the commodity information processing system 1 according to this embodiment, the scanner 104 is provided separately from a below-mentioned CCD scanner 303 provided in the settlement apparatus 300.

The portable terminal 100 includes, as shown in FIG. 5, a CPU (Central Processing Unit) 121, a ROM (Read Only Memory) 122, a RAM (Random Access Memory) 123, and a clock section 124 configured to measure date and time. The CPU 121, the ROM 122, the RAM 123, and the clock section 124 are connected via a bus line 129 such as an address bus or a data bus. The CPU 121, the ROM 122, the RAM 123, and the clock section 124 configure a control section, which is a computer.

The CPU 121 controls the portable terminal 100 by executing various computer-readable programs stored in the ROM 122. The ROM 122 has stored therein the various computer programs executed by the CPU 121 and various data. The RAM 123 temporarily stores the various computer programs executed by the CPU 121. The RAM 123 rewritably stores various data. A power supply for the RAM 123 is backed up by the battery 105. Therefore, the RAM 123 keeps the stored data even if the power supply is turned off.

The portable terminal 100 includes a scanner controller 125, a display controller 126, a key controller 127, a first radio communication interface (in the figure, I/F) 110, and a second radio communication interface (in the figure, I/F) 128. In the portable terminal 100, the scanner controller 125, the display controller 126, the key controller 127, the first radio communication interface 110, and the second radio communication interface 128 are connected to the CPU 121 by the bus line 129.

The scanner controller 125 captures a signal of data read by the scanner 104 and inputs the signal to the CPU 121. The display controller 126 controls the driving of the display 102 and displays characters or the like corresponding to display data given from the CPU 121 on the display 102. The key controller 127 captures signals output from the key section 103 and the trigger switches 108 and 109 and notifies the CPU 121 of the signals.

The first radio communication interface 110 controls radio data communication with the portable printer 200. In this embodiment, the first radio communication interface 110 performs radio communication between the portable terminal 100 and the portable printer 200 using an infrared ray. The first radio communication interface 110 may perform the radio communication between the portable terminal 100 and the portable printer 200 using a radio wave, light, an infrared ray, ultrasound, proximity radio communication (e.g., Bluetooth (registered trademark)), or the like.

The second radio communication interface 128 controls radio data communication with the radio access point 500. The portable terminal 100 performs, with the second radio communication interface 128, data communication with other apparatuses such as the store server 400 via the radio access point 500. In this embodiment, the portable terminal 100 and the radio access point 500 configure a radio LAN system employing a radio LAN system.

As shown in FIG. 6, the RAM 123 includes a commodity information storage area 123a. The commodity information storage area 123a stores, for each commodity indicated by a commodity code read from a barcode by the scanner 104, commodity information such as a commodity code, a commodity name, and a unit price and benefit information indicating a benefit such as a price-cut, a discount, or point grant provided for a transaction of the commodity in association with each other. In other words, the commodity information storage area 123a of the RAM 123 is a storing section configured to store commodity information of a commodity indicated by a commodity code read from a barcode by the scanner 104 and benefit information of a benefit provided for a transaction of the commodity indicated by the commodity code. Further, the RAM 123 stores terminal information such as a terminal ID for specifying the portable terminal 100.

The portable printer 200 issues, for example, the provisional receipt 800 (FIG. 10) as an information display medium on which information is displayed. The portable printer 200 is, for example, a printer of a line thermal type that uses, as a sheet, roll paper wound in a roll shape. The portable printer 200 draws out the roll paper wound in the roll shape. Subsequently, the portable printer 200 prints information on the drawn-out roll paper and generates the provisional receipt 800. The portable printer 200 cuts the provisional receipt 800 from the roll paper and issues the provisional receipt 800. The portable printer 200 includes a control section (not shown) including a CPU, a ROM, and a RAM and a radio communication interface (not shown) connected to the control section. The portable printer 200 performs radio data communication with the portable terminal 100 through the radio communication interface.

The settlement apparatus 300 includes, as shown in FIG. 1, a POS (Point Of Sales) terminal 301 functioning as a computer, a barcode scanner 302 connected to the POS terminal 301, and a CCD (Charge Coupled Device) scanner 303 connected to the POS terminal 301.

Figure 7:
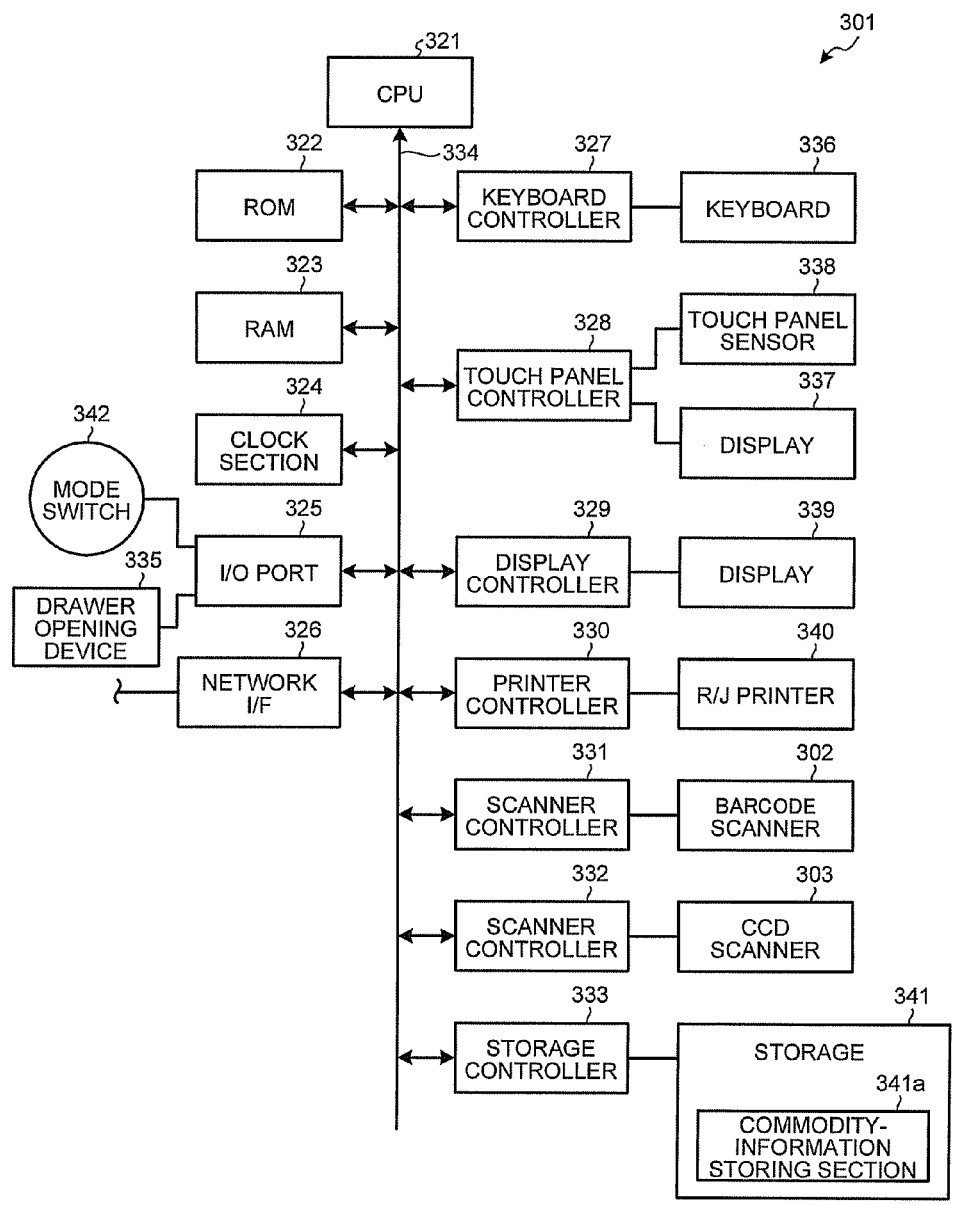
FIG. 7 is a diagram of a schematic configuration of a POS terminal.

FIG. 7 is a diagram of a schematic configuration of the POS terminal. The POS terminal 301 includes, as shown in FIG. 7, a CPU 321, a ROM 322, a RAM 323, a clock section 324, an I/O (Input/Output) port 325, a network interface 326, a keyboard controller 327, a touch panel controller 328, a display controller 329, a printer controller 330, scanner controllers 331 and 332, and a storage controller 333. In the POS terminal 301, the CPU 321, the ROM 322, the RAM 323, the clock section 324, the I/O (Input/Output) port 325, the network interface 326, the keyboard controller 327, the touch panel controller 328, the display controller 329, the printer controller 330, the scanner controllers 331 and 332, and the storage controller 333 are connected via a bus line 334 such as an address bus or a data bus.

The CPU 321 controls the POS terminal 301 by executing various computer-readable programs stored in the ROM 322. The ROM 322 has stored therein the various computer programs executed by the CPU 321 and various data. The RAM 323 stores the various computer programs executed by the CPU 321 and various data.

The clock section 324 measures the present date and time. The network interface 326 controls data communication with other apparatuses connected through the wired communication network 700 or the like. The I/O port 325 receives the input of a mode selection signal from a mode switch 342. The I/O port 325 outputs a driving signal to a drawer opening device 335 configured to automatically open a drawer (not shown). The keyboard controller 327 captures a key signal corresponding to an operation key from a keyboard 336 and notifies the CPU 321 of the key signal. The touch panel controller 328 controls the driving of a customer display 337 with a touch panel and displays, in color, characters or the like corresponding to display data supplied from the CPU 321 on the display 337. The touch panel controller 328 captures a signal from a touch panel sensor 338 attached to a screen of the display 337 and notifies the CPU 321 of the signal. The display controller 329 controls the driving of an operator display 339 and displays, in color, characters or the like corresponding to display data given from the CPU 321 on the display 339. The printer controller 330 controls the driving of a receipt and journal (in the figure, R/J) printer 340 and performs receipt printing and journal printing on the basis of printing data supplied from the CPU 321. The scanner controller 331 captures a signal of data read by the barcode scanner 302 and inputs the signal to the CPU 321. The scanner controller 332 captures a signal of data read by the CCD scanner 303 and inputs the signal to the CPU 321. The storage controller 333 controls writing of data in and readout of data from a storage 341 on the basis of an instruction signal from the CPU 321.

The storage 341 is, for example, a hard disk drive device and has stored therein, for example, a computer program for causing the CPU 321 to operate. The storage 341 includes a commodity-information storing section 341a configured to store various kinds of information such as a commodity master file in which commodity information such as a commodity code, a commodity name, and a unit price of a transaction target commodity and benefit information indicating a benefit such as a price-cut, a discount, or point grant provided for a transaction of the commodity are stored in association with each other. The commodity information and the benefit information stored in the commodity master file of the commodity-information storing section 341a are copies of those stored in a store server 400 explained later.

The barcode scanner 302 optically reads a barcode affixed to a commodity. The CCD scanner 303 is an image pickup section configured to optically pick up an image including a two-dimensional code such as a QR code (registered trademark) printed on the provisional receipt 800 (see FIG. 10). For example, the CCD scanner 303 picks up a frame image at a predetermined frame rate such as 30 fps.

Figure 8:
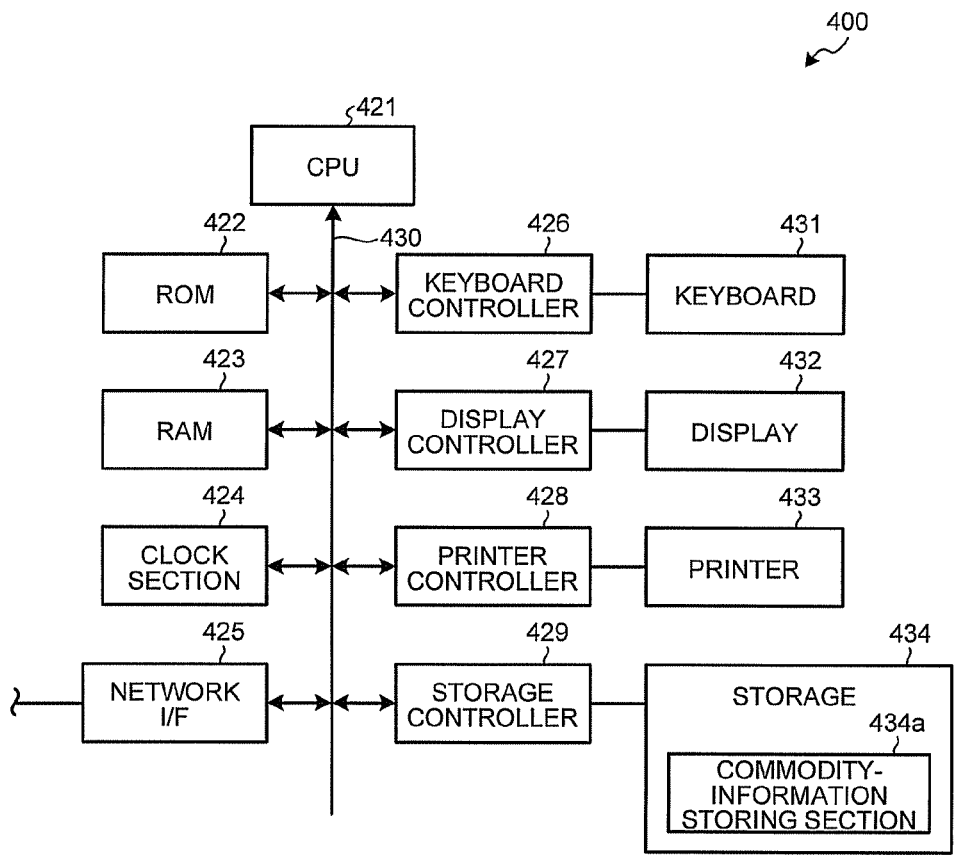
FIG. 8 is a diagram of a schematic configuration of a store server.

FIG. 8 is a diagram of a schematic configuration of the store server. The store server 400 includes, as shown in FIG. 8, a CPU 421, a ROM 422, a RAM 423, a clock section 424, a network interface (in the figure, I/F) 425, a keyboard controller 426, a display controller 427, a printer controller 428, and a storage controller 429. In the store server 400, the CPU 421, the ROM 422, the RAM 423, the clock section 424, the network interface (in the figure, I/F) 425, the keyboard controller 426, the display controller 427, the printer controller 428, and the storage controller 429 are connected via a bus line 430 such as an address bus or a data bus.

The CPU 421 controls the store server 400 by executing various computer-readable programs stored in the ROM 422. The ROM 422 has stored therein the various computer programs executed by the CPU 421 and various data. The RAM 423 stores the various computer programs executed by the CPU 421 and various data.

The clock section 424 measures the present date and time. The network interface 425 controls data communication with other apparatuses connected through the wired communication network 700 or the like. The store server 400 can perform data communication with the portable terminal 100 and the POS terminal 301 of the settlement apparatus 300 through the wired communication network 700. The keyboard controller 426 captures a key signal corresponding to an operation key from a keyboard 431 and notifies the CPU 421 of the key signal. The display controller 427 controls the driving of a display 432 and displays, in color, characters or the like corresponding to display data given from the CPU 421 on the display 432. The printer controller 428 controls the driving of a printer 433 and performs printing on a sheet on the basis of printing data supplied from the CPU 421. The storage controller 429 controls writing of data in and readout of data from a storage 434 on the basis of an instruction signal from the CPU 421.

The storage 434 is, for example, a hard disk drive device and has stored therein, for example, a computer program for causing the CPU 421 to operate. The storage 434 includes a commodity-information storing section 434a configured to store various kinds of information such as commodity information such as a commodity code, a commodity name, and a unit price of a transaction target commodity and benefit information indicating a benefit such as a price-cut, a discount, or point grant provided for a transaction of the commodity. In other words, the commodity-information storing section 434a stores a commodity master file in which commodity information such as a commodity code, a commodity name, and a unit price of a transaction target commodity and benefit information provided for a transaction of the commodity are stored in association with each other.

The radio access point 500 is a radio communication apparatus for connecting an apparatus (e.g., the store server 400) connected to the wired communication network 700 and the portable terminal 100 and performs protocol conversion between a wireless LAN and a wired LAN. The radio access point 500 is, for example, a computer including a control section including a CPU, a ROM, and a RAM, a network interface, and a radio communication interface.

Pre-handling processing and checkout processing among kinds of processing executed by the CPU 121 of the portable terminal 100, the CPU 321 of the POS terminal 301, and the CPU 421 of the store server 400 of the commodity information processing system 1 according to computer programs are explained below.

Figure 9:
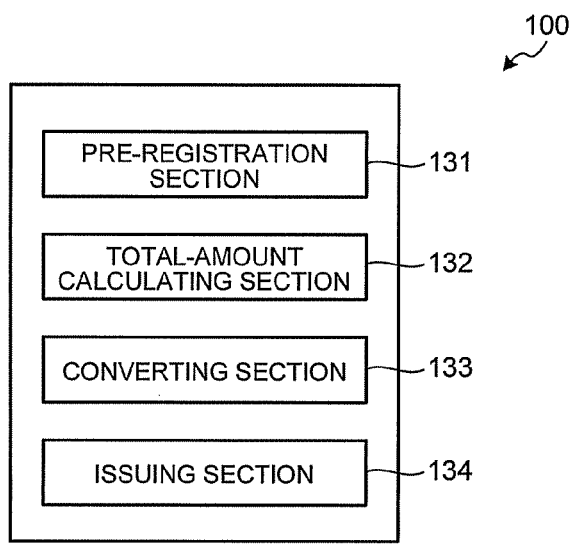
FIG. 9 is a diagram of a functional configuration of a CPU of the portable terminal.

First, the pre-handling processing is explained. FIG. 9 is a diagram of a functional configuration of the CPU of the portable terminal. The portable terminal 100 and the store server 400 execute the pre-handling processing. The CPU 121 of the portable terminal 100 realizes, according to a computer program, a pre-registration section 131, a total-amount calculating section 132, a converting section 133, and an issuing section 134 as functional sections as shown in FIG. 9.

The pre-registration section 131 registers a commodity indicated by a commodity code read from a barcode by the scanner 104. Specifically, if the commodity code read from the barcode is input from the scanner 104, the pre-registration section 131 reads out, from the commodity-information storing section 434a of the store server 400, commodity information such as a commodity name and a unit price and benefit information associated with the commodity code read by the scanner 104. Subsequently, the pre-registration section 131 registers the commodity by causing the commodity information storage area 123a to store the read-out commodity information and benefit information in association with each other. In reading out the commodity information and the benefit information, the pre-registration section 131 transmits a signal including the input commodity code and requesting the commodity information and the benefit information to the store server 400. Subsequently, the pre-registration section 131 receives the commodity information and the benefit information transmitted from the store server 400 as a response. The pre-registration section 131 causes the commodity information storage area 123a to store the received commodity information and benefit information in association with each other. The pre-registration section 131 performs the registration of a commodity every time a commodity code is input from the scanner 104. The pre-registration section 131 causes the commodity information storage area 123a to store the commodity information and the benefit information in association with each other with numbers affixed thereto in the order of input.

If the registration of commodities is completed by the pre-registration section 131, the total-amount calculating section 132 calculates a total amount of the commodities registered by the pre-registration section 131. Specifically, the total-amount calculating section 132 reads out unit prices of the commodities included in the commodity information stored in the commodity information storage area 123a. Subsequently, the total-amount calculating section 132 calculates a total of the read-out unit prices of the commodities as a total amount.

The converting section 133 converts transaction information concerning a transaction of a commodity indicated by a commodity code read by the scanner 104 into one two-dimensional code or plural two-dimensional codes having different sizes. Specifically, the converting section 133 reads out, from the commodity information storage area 123a, commodity information of a transaction target commodity and benefit information concerning a benefit provided for a transaction of the commodity registered by the pre-registration section 131. The converting section 133 reads out terminal information stored in the RAM 123. The converting section 133 converts, for each of the kinds of transaction information, the read-out commodity information, benefit information, and terminal information into plural two-dimensional codes having different sizes, which are QR codes including size versions indicating the sizes of the own codes, as the transaction information. If an information amount of respective kinds of transaction information is equal to or smaller than a predetermined information amount, the converting section 133 converts the transaction information into one QR code. On the other hand, if an information amount of respective kinds of transaction information is larger than the predetermined information amount, the converting section 133 converts the transaction information into plural QR codes. If the converting section 133 converts plural kinds of transaction information into plural QR codes for each of the kinds of transaction information, the converting section 133 converts the transaction information into QR codes having sizes different from the sizes of QR codes already converted from the transaction information. In this embodiment, if the converting section 133 converts plural kinds of transaction information into QR codes, the converting section 133 converts the respective kinds of transaction information into plural QR codes having continuous sizes.

Figure 10:
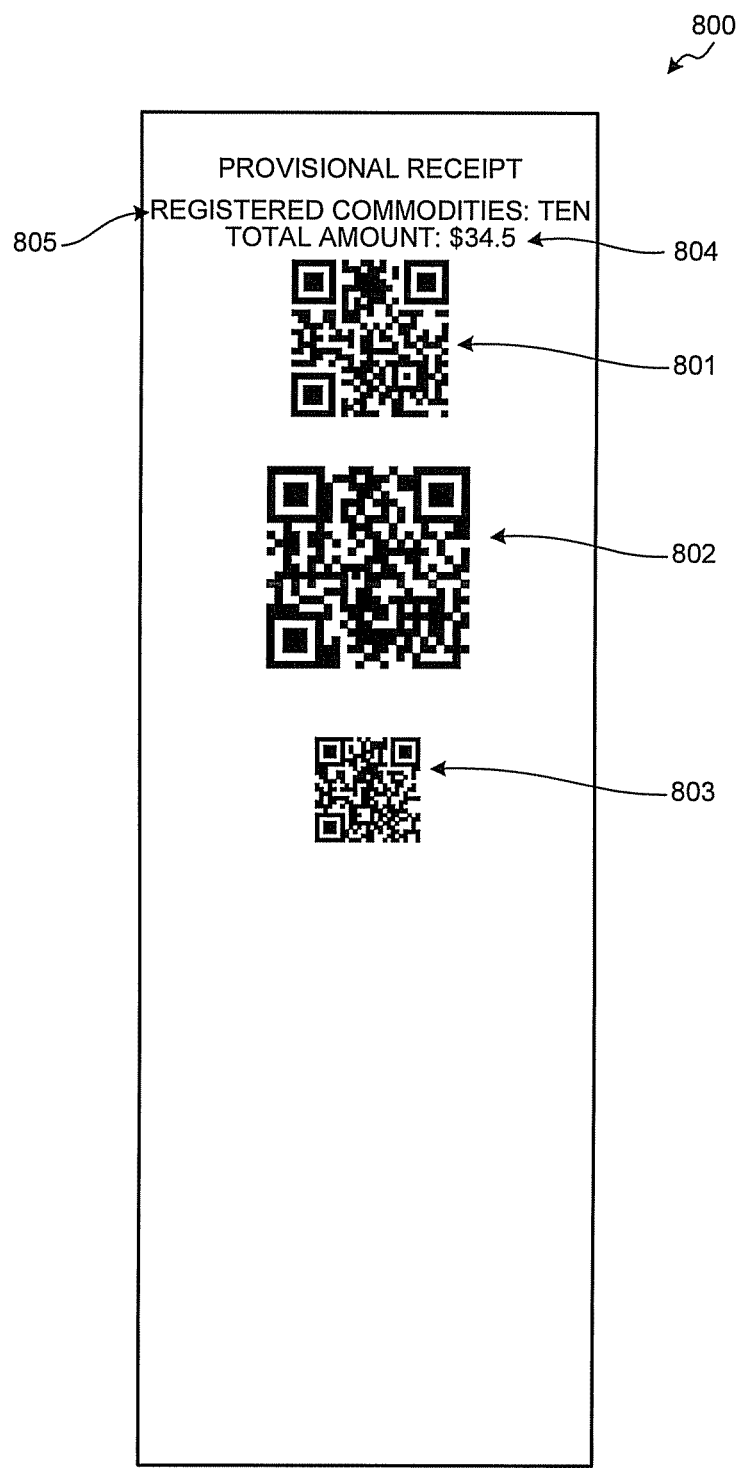
FIG. 10 is a diagram of an example of a provisional receipt.

The predetermined information amount is an information amount that is set according to the width of a sheet used as the provisional receipt 800 (see FIG. 10) and can be converted into a two-dimensional code having a size fit within the width of the sheet used as the provisional receipt 800 (see FIG. 10). For example, if a sheet having a width of 5 cm is used as the provisional receipt 800, the converting section 133 sets an information amount of commodity information (transaction information) for twenty-five commodities to the predetermined information amount.

If the converting section 133 converts the transaction information into QR codes, the converting section 133 includes, in the QR codes, size versions of the QR codes and number information indicating the number of QR codes obtained by converting the transaction information. The size versions of the QR codes are determined at an interval of four cells from 21×21 cells of a size version 1 to 177×177 cells of a size version 40. Therefore, if the converting section 133 converts, for each of kinds of transaction information, commodity information, benefit information, and terminal information into three QR codes as transaction information, the converting section 133 includes, in the QR codes, size versions (e.g., size versions 1 to 3) of the QR codes and number information (e.g., 1/3, 2/3, and 3/3) indicating the number of QR codes obtained by converting the transaction information.

The issuing section 134 causes the portable printer 200 to issue a provisional receipt on which a QR code converted from transaction information by the converting section 133 is displayed. In this embodiment, the issuing section 134 causes the portable printer 200 to issue a provisional receipt on which QR codes are displayed in the order of conversion by the converting section 133. The provisional receipt is shown in FIG. 10. Plural QR codes 801 to 803 having different sizes are displayed on the provisional receipt 800.

In this embodiment, as shown in FIG. 10, the issuing section 134 displays, in addition to the QR codes 801 to 803, a total amount 804 calculated by the total-amount calculating section 132 and the number of commodities 805 registered by the pre-registration section 131 on the provisional receipt 800 through printing by the portable printer 200.

Figure 11:
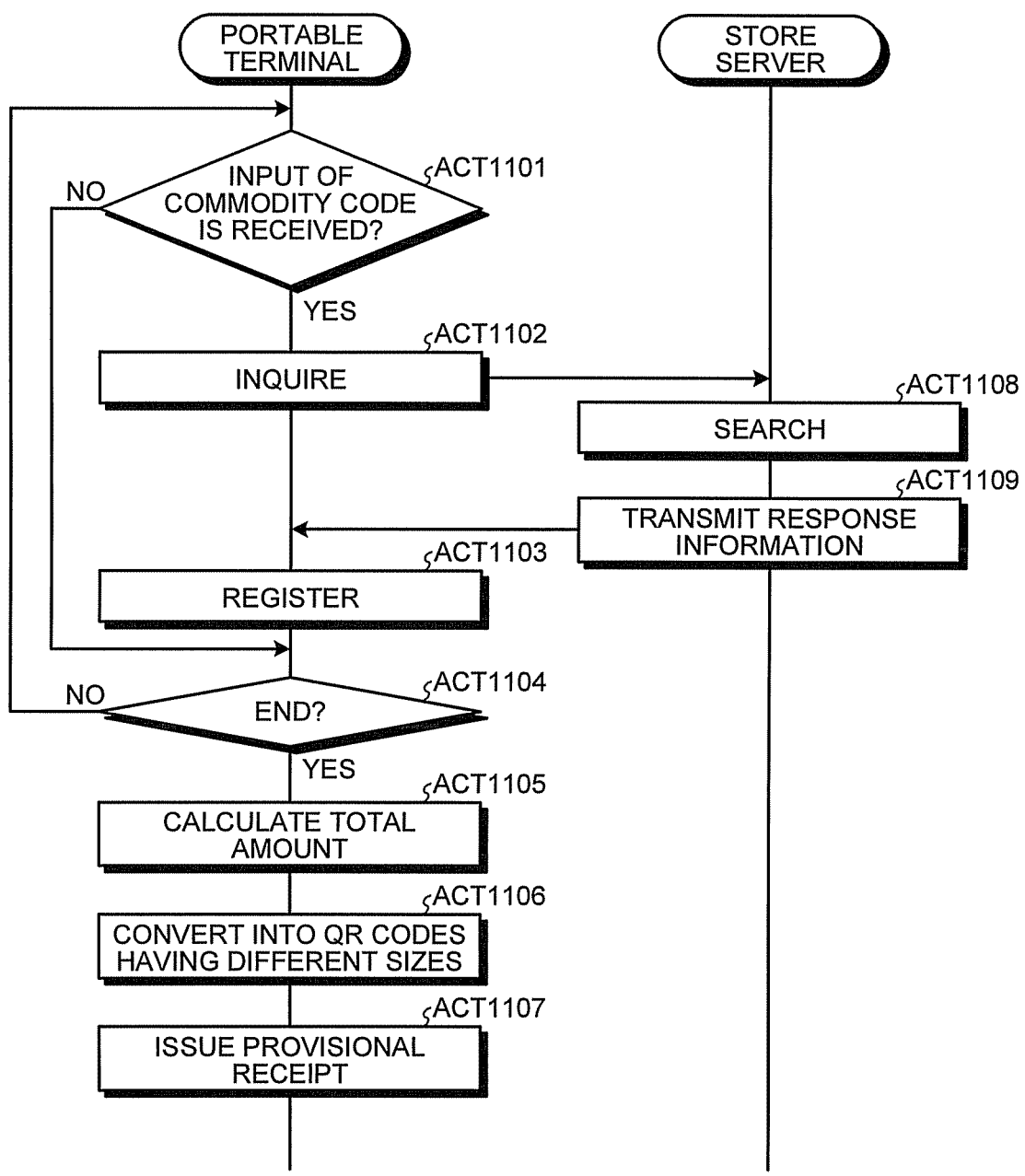
FIG. 11 is a flowchart for explaining a flow of pre-handling processing.

A flow of the pre-handling processing is explained with reference to FIG. 11. FIG. 11 is a flowchart for explaining the flow of the pre-handling processing. The CPU 121 of the portable terminal 100 waits for a commodity code of a transaction target commodity to be input by the scanner 104 (No in Act 1101 and No in Act 1104). If a commodity code is input by the scanner 104, the CPU 121 receives the input of the commodity code (Yes in Act 1101).

If the input of the commodity code is received, the pre-registration section 131 transmits a signal including the input commodity code to the store server 400 and inquires the store server 400 about commodity information of a commodity indicated by the input commodity code and benefit information of a benefit provided for a transaction of the commodity (Act 1102).

In the store server 400 that receives the inquiry from the portable terminal 100, the CPU 421 searches through the commodity-information storing section 434a with the commodity code received from the portable terminal 100 and obtains commodity information of a commodity indicated by the received commodity code and benefit information associated with the commodity information (Act 1108). The CPU 421 transmits the commodity information and the benefit information of the commodity, about which the store server 400 is inquired by the pre-registration section 131, to the portable terminal 100 as response information (Act 1109).

In the portable terminal 100 that receives the commodity information and the benefit information from the store server 400 as the response information, the pre-registration section 131 causes the commodity information storage area 123a to store the received commodity information and benefit information and registers the commodity indicated by the input commodity code (Act 1103). If the end of registration of commodities in the same transaction processing is not declared by operation of a predetermined key of the key section 103 (No in Act 1104), the CPU 121 and the pre-registration section 131 perform the processing in Acts 1101 to 1103 every time a commodity code is input from the scanner 104. If the predetermined key of the key section 103 is operated and the end of registration of commodities in the same transaction processing is declared (Yes in Act 1104), the CPU 121 ends the registration of commodities.

Subsequently, the total-amount calculating section 132 calculates, referring to unit prices included in the commodity information stored in the commodity information storage area 123a, a total amount of all commodities registered by the pre-registration section 131 (Act 1105). The converting section 133 reads out the commodity information and the benefit information stored in the commodity information storage area 123a and the terminal information stored in the RAM 123 and converts, for each of the kinds of transaction information, the commodity information, the benefit information, and the terminal information into QR codes having different sizes (Act 1106).

The issuing section 134 causes the portable printer 200 to issue the provisional receipt 800 on which the QR codes converted by the converting section 133, the total amount 804 calculated by the total-amount calculating section 132, the number of commodities 805 registered by the pre-registration section 131, and the like are displayed (Act 1107).

Figure 12:
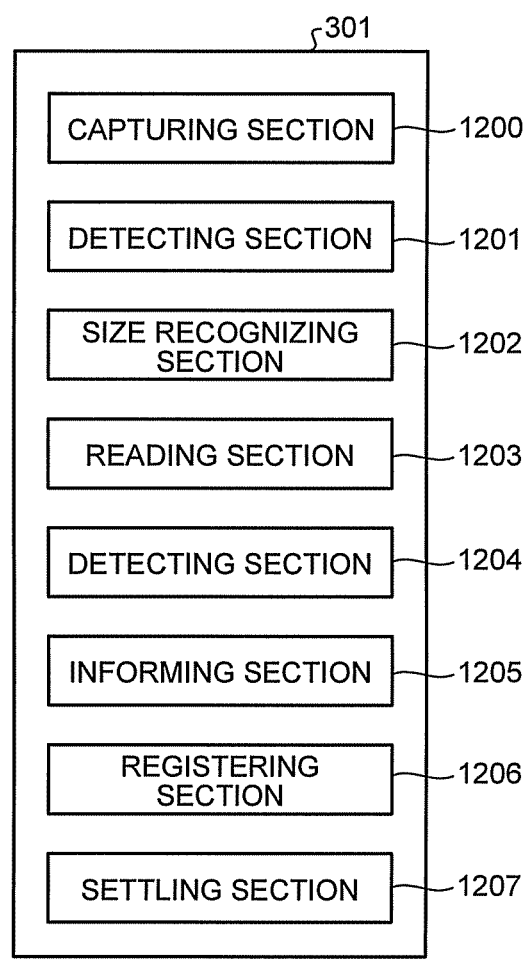
FIG. 12 is a diagram of a functional configuration of a CPU of the POS terminal.

The checkout processing performed by the CPU 321 of the POS terminal 301 is explained below. FIG. 12 is a diagram of a functional configuration of the CPU of the POS terminal. The CPU 321 realizes, according to a computer program, a capturing section 1200, a detecting section 1201, a size recognizing section 1202, a reading section 1203, a detecting section 1204, an informing section 1205, a registering section 1206, and a settling section 1207 as functional sections as shown in FIG. 12.

The capturing section 1200 sequentially captures frame images including QR codes picked up by the CCD scanner 303 and displayed on the provisional receipt 800.

The detecting section 1201 detects the QR codes from the frame images picked up by the CCD scanner 303. Specifically, the detecting section 1201 retrieves a pattern for position detection such as a finder pattern from the frame image captured by the capturing section 1200 and performs, for example, detection of plural QR codes 801 to 803.

The size recognizing section 1202 recognizes the size of a QR code detected by the detecting section 1201. In this embodiment, the size recognizing section 1202 recognizes the size of the detected QR code from a size version included in the detected QR code.

In this embodiment, the size recognizing section 1202 recognizes the size of the QR code from the size version of the detected QR code. However, the recognition of the size of a code is not limited to this. For example, the size recognizing section 1202 may recognize the size of a two-dimensional code such as a QR code displayed on a provisional receipt from a ratio of the width of the two-dimensional code and the length from the end of the two-dimensional code to the end of the provisional receipt.

If the size of the QR code recognized by the size recognizing section 1202 is different from the size of a QR code already recognized in the same transaction processing, the reading section 1203 reads transaction information from the QR code detected by the detecting section 1201. In this embodiment, the reading section 1203 determines, as the size of the QR code recognized in the same transaction processing, the size of a QR code recognized by the size recognizing section 1202 before a closing key of the keyboard 336 is pressed. The reading section 1203 stores the sizes of QR codes recognized in the same transaction processing (i.e., the sizes of QR codes recognized before the closing key of the keyboard 336 is pressed) in the RAM 323 in the order of the recognition. If the size of the QR code recognized by the size recognizing section 1202 does not coincide with the size of a QR code stored in the RAM 323, the reading section 1203 determines that the size of the QR code recognized by the size recognizing section 1202 is different from the size of the QR code already recognized in the same transaction processing. The reading section 1203 reads transaction information from the QR code detected by the detecting section 1201.

The reading section 1203 generates sales data including commodity information, benefit information, and terminal information read as the transaction information. The reading section 1203 causes a storing section such as the RAM 323 to store the generated sales data. If commodity information of plural commodities is read as the transaction information, the reading section 1203 generates sales data for each of the commodities.

Consequently, transaction information converted into a QR code and an identifier of the QR code are not read and the transaction information is prevented from being read twice from the same QR code. Therefore, it is possible to easily prevent transaction information from being read twice from a QR code without using a complicated algorithm for preventing the transaction information from being read twice. If the size of the QR code recognized by the size recognizing section 1202 is the same as the size of the QR code already recognized in the same transaction processing, the reading section 1203 discards the QR code detected by the detecting section 1201 without performing reading from the detected QR code.

The reading section 1203 reads, from the QR codes detected by the detecting section 1201, number information indicating the number of QR codes obtained by converting transaction information with the converting section 133 of the portable terminal 100.

If plural kinds of transaction information are converted into plural QR codes having continuous sizes for each of the kinds of transaction information, the detecting section 1204 detects detection omission of the QR codes if sizes recognized by the size recognizing section 1202 are not continuous. If the number information is read by the reading section 1203, the detecting section 1204 detects detection omission of the QR codes if the sizes of the QR codes recognized by the size recognizing section 1202 are not continuous in the same transaction processing by the number of QR codes indicated by the number information read by the reading section 1203. For example, if the number of QR codes indicated by the number information read by the reading section 1203 is three and the sizes of the QR codes recognized by the size recognizing section 1202 are 21×21 cells, 25×25 cells, and 29×29 cells, the detecting section 1204 determines that there is no detection omission of the QR codes because the recognized sizes of the QR codes are continuous by the number of the QR codes indicated by the read number information. On the other hand, if the number indicated by the number information read by the reading section 1203 is three and the sizes of the QR codes recognized by the size recognizing section 1202 are 21×21 cells and 29×29 cells, the detecting section 1204 determines that there is detection omission of the QR codes because three sizes of the QR codes recognized by the size recognizing section 1202 are not continuous. If the number of QR codes indicated by the number information read by the reading section 1203 is three and the sizes of the QR codes recognized by the size recognizing section 1202 are 21×21 cells and 25×25 cells, the detecting section 1204 determines that there is detection omission of the QR codes because the sizes of the QR codes are not recognized by the number of QR codes indicated by the read number information.

If detection omission of the QR codes is detected by the detecting section 1204, the informing section 1205 informs the detection omission of the QR codes by displaying a message on the operator display 339 or emitting warning sound from a not-shown buzzer.

The registering section 1206 registers a commodity indicated by a commodity code read by the barcode scanner 302. Specifically, if the registering section 1206 receives the input of a commodity code from the barcode scanner 302, the registering section 1206 reads out commodity information such as a commodity code, a commodity name, and a unit price and benefit information of a commodity indicated by the input commodity code from the commodity-information storing section 341*a*. The registering section 1206 generates sales data including the read-out commodity information such as the commodity code, the commodity name, and the unit price and benefit information. The registering section 1206 registers the commodity by causing a storing section (a sales master file) such as the RAM 323 to store the sales data.

The settling section 1207 performs settlement of the commodity registered by the registering section 1206 or the commodity, the commodity information (the transaction information) of which is read by the reading section 1203. Specifically, if the closing key of the keyboard 336 is pressed, the settling section 1207 calculates, referring to the sales data generated by the registering section 1206 or the sales data generated by the reading section 1203, a total selling price of commodities registered by the registering section 1206 or commodities, commodity information of which is read by the reading section 1203. The settling section 1207 causes the displays 337 and 339 to display the calculated total selling price. If a deposit amount equal to or larger than the total selling price is input through the operation of the keyboard 336 by the store clerk, the settling section 1207 performs settlement of the commodities by receiving the input amount. In this way, the settling section 1207 performs settlement of commodities specified by commodity information read by the reading section 1203 or commodity codes read by the barcode scanner 302. The settling section 1207 issues, with the receipt and journal printer 340, a receipt on which predetermined contents including the sales data stored in the RAM 323 are displayed. The settling section 1207 generates journal data related to one transaction including the total selling price. The settling section 1207 records the generated journal data on a journal sheet with the receipt and journal printer 340 and opens the drawer.

Figure 13:
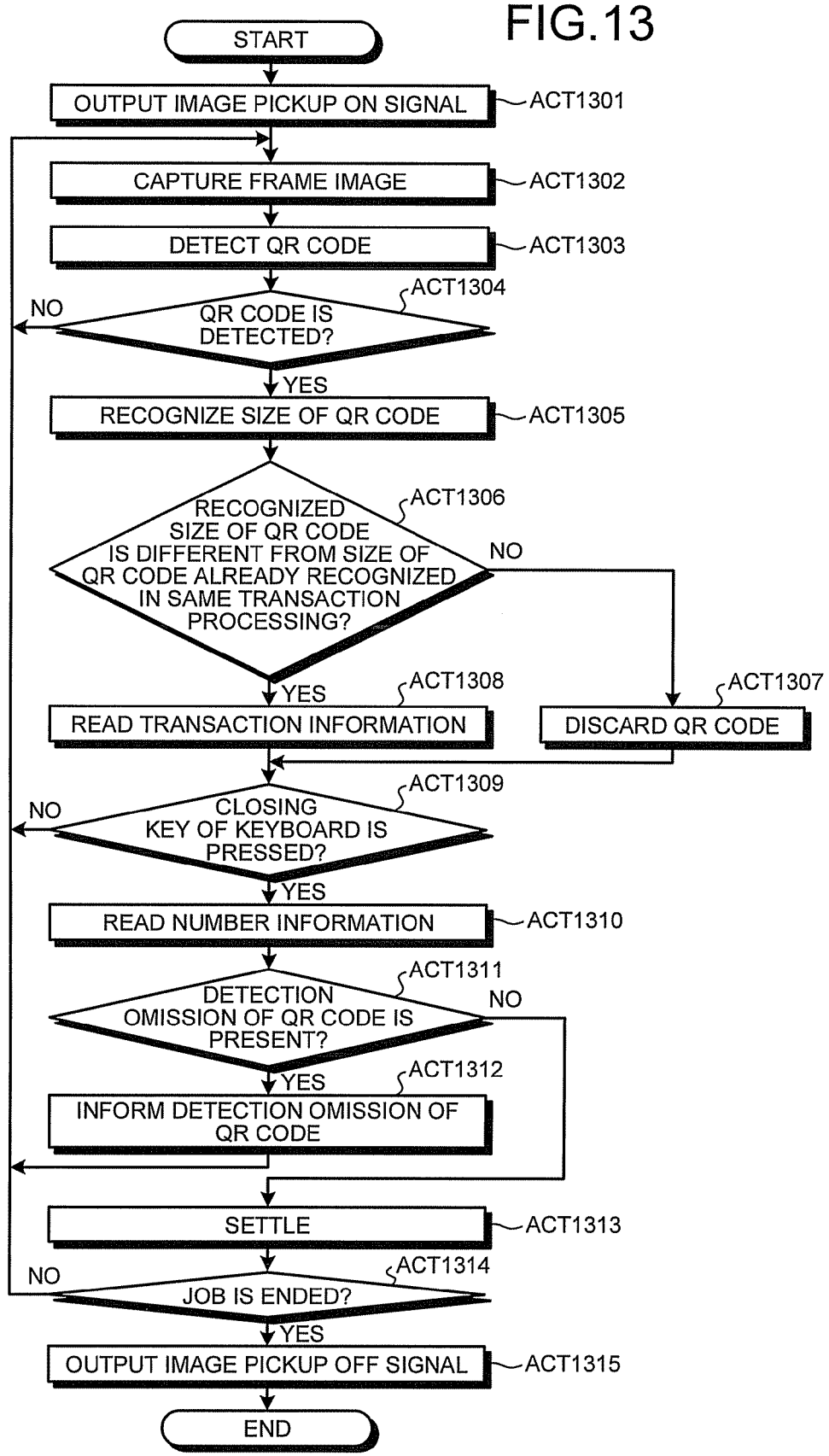
FIG. 13 is a flowchart for explaining a flow of checkout processing.

A flow of the checkout processing is explained below with reference to FIG. 13. FIG. 13 is a flowchart for explaining the flow of the checkout processing.

First, the CPU 321 outputs an image pickup ON signal to the CCD scanner 303 and starts image pickup of a frame image by the CCD scanner 303 (Act 1301). Subsequently, the capturing section 1200 captures a frame image picked up by the CCD scanner 303 (Act 1302). The detecting section 1201 detects, from the frame image captured by the capturing section 1200, a QR code obtained by converting transaction information concerning a transaction of a commodity (Act 1303)

The size recognizing section 1202 determines whether a QR code is detected by the detecting section 1201 (Act 1304). If a QR code is not detected (No in Act 1304), the CPU 321 returns to the processing in Act 1302 and performs processing for the next frame image. On the other hand, if a QR code is detected (Yes in Act 1304), the size recognizing section 1202 recognizes the size of the detected QR code (Act 1305). Subsequently, the reading section 1203 determines whether the recognized size of the QR code is different from the size of a QR code already recognized in the same transaction processing (Act 1306). If the recognized size of the QR code is the same as the size of the QR code already recognized in the same transaction processing (No in Act 1306), the reading section 1203 discards the QR code detected by the detecting section 1201 (Act 1307). On the other hand, if the recognized size of the QR code is different from the size of the QR code already recognized in the same transaction processing or the size of a QR code is not recognized in the same transaction processing yet (Yes in Act 1306), the reading section 1203 reads transaction information from the QR code detected by the detecting section 1201 (Act 1308).

The CPU 321 determines whether the closing key of the keyboard 336 is pressed (Act 1309). If the closing key of the keyboard 336 is not pressed (No in Act 1309), the CPU 321 returns to the processing in Act 1302 and performs capturing of the next frame image. On the other hand, if the closing key of the keyboard 336 is pressed (Yes in Act 1309), the reading section 1203 reads the number information from detected QR codes (Act 1310).

The detecting section 1204 detects detection omission of the QR codes according to whether the sizes of the QR codes recognized by the size recognizing section 1202 are continuous by the number of QR codes indicated by the number information read by the reading section 1203 (Act 1311). If detection omission of the QR codes is detected (Yes in Act 1311), the informing section 1205 informs the detection omission of the QR codes (Act 1312). If the detection omission of the QR codes is informed, the CPU 321 returns to the processing in Act 1302 and performs capturing of a frame image again.

On the other hand, if detection omission of the QR codes is not detected (No in Act 1311), the settling section 1207 performs settlement of commodities, transaction information (commodity information) of which is read by the reading section 1203 (Act 1313).

Subsequently, the CPU 321 determines whether a job is ended (Act 1314). If the job is continued (No in Act 1314), the CPU 321 returns to the processing in Act 1302 and performs processing for the next frame image. On the other hand, if the job is ended (Yes in Act 1314), the CPU 321 outputs an image pickup OFF signal to the CCD scanner 303 and ends the image pickup by the CCD scanner 303 (Act 1315) and ends the processing.

As explained above, the commodity information processing system 1 according to this embodiment reads commodity information indicating a transaction target commodity from a code symbol affixed to the commodity, converts, for each of kinds of transaction information, transaction information concerning a transaction of the commodity indicated by the read commodity information into one QR code or plural QR codes having different sizes, issues the provisional receipt 800 on which the converted QR code is displayed (the converted QR codes are displayed), picks up an image of the QR code (s) displayed on the issued provisional receipt 800, captures the picked up image, detects the QR code (s) from the captured image, recognizes the size (s) of the detected QR code (s), and, if the recognized size (s) of the QR code (s) is (are) different from the size (s) of QR code (s) already recognized in the same transaction, reads the transaction information from the detected QR code (s). Therefore, transaction information converted into a QR code and an identifier of the QR code are not read and the transaction information is prevented from being read twice from the same QR code. Therefore, it is possible to easily prevent transaction information from being read twice from a QR code without using a complicated algorithm for preventing the transaction information from being read twice.

In this embodiment, when plural kinds of transaction information are converted into plural two two-dimensional codes for each of the kinds of transaction information, the transaction information is converted into a two-dimensional code having a size different from the size of a two-dimensional code obtained by converting transaction information immediately before the conversion of the transaction information in the same transaction processing. In the following explanation, explanation same as the explanation in the embodiment is omitted and differences from the embodiment are explained.

If the converting section 133 according to this embodiment converts plural kinds of transaction information into plural QR codes for each of the kinds of transaction information, the converting section 133 converts the transaction information into a QR code having a size different from the size of a QR code converted from transaction information immediately before the conversion of the transaction information. In other words, in converting transaction information into a QR code, if the size of the QR code is different from the size of a QR code converted from transaction information immediately before the conversion of the transaction information, the converting section 133 may convert the transaction information into a QR code having a size same as the size of a QR code already converted from the transaction information.

Figure 14:
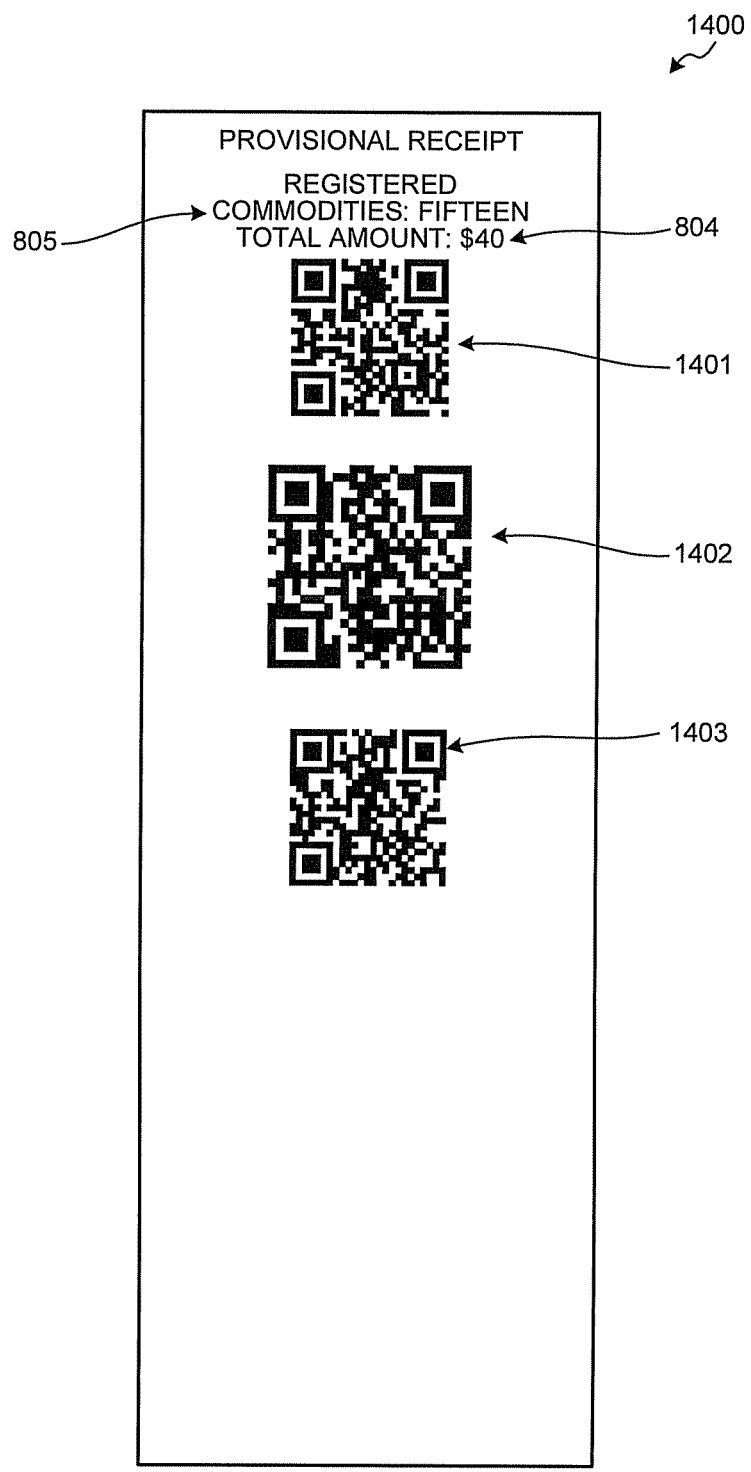
FIG. 14 is a diagram of an example of the provisional receipt.

FIG. 14 is a diagram of an example of a provisional receipt. If the converting section 133 converts three kinds of transaction information, i.e., commodity information, benefit information, and terminal information into three QR codes for each of the kinds of transaction information, the converting section 133 converts the commodity information into a QR code 1401 of a size version 1. Subsequently, the converting section 133 converts the benefit information into a QR code 1402 of a size version 2. The converting section 133 converts the terminal information into a QR code 1403 of the size version 1 different from the size version 2 of the QR code into which the service information is converted.

As shown in FIG. 14, the issuing section 134 according to this embodiment issues a provisional receipt 1400 on which the QR codes 1401 to 1403 converted by the converting section 133 are displayed in the order of conversion into the QR codes.

If the size of a QR code recognized by the size recognizing section 1202 is different from the size of a QR code recognized immediately before the recognition of the QR code in the same transaction processing, the reading section 1203 according to this embodiment reads the transaction information from the QR code detected by the detecting section 1201. Specifically, if the size of the QR code recognized by the size recognizing section 1202 does not coincide with the size of a QR code stored last in the RAM 323, the reading section 1203 determines that the size of the QR code recognized by the size recognizing section 1202 is different from the size of a QR code recognized immediately before the recognition of the QR code in the same transaction processing and reads the transaction information of the QR code detected by the detecting section 1201.

As explained above, the commodity information processing system 1 according to this embodiment reads commodity information indicating a transaction target commodity from a code symbol affixed to the commodity, converts, for each of kinds of transaction information, transaction information concerning a transaction of the commodity indicated by the read commodity information into plural QR codes having sizes different from the size of a QR code obtained by converting transaction information immediately before the conversion of the transaction information, issues the provisional receipt 1400 on which the converted QR codes are displayed, picks up an image of the QR codes displayed on the issued provisional receipt 1400, captures the picked up image, detects the QR codes from the captured image, recognizes the sizes of the detected QR codes, and, if the recognized sizes of the QR codes are different from the sizes of QR codes recognized immediately before the recognition of the QR codes in the same transaction, reads the transaction information from the detected QR codes. Therefore, transaction information converted into a QR code and an identifier of the QR code are not read and the transaction information is prevented from being read twice from at least a QR code from which transaction information is read immediately before the reading of the QR code. Therefore, it is possible to easily prevent transaction information from being read twice from a QR code without using a complicated algorithm for preventing the transaction information from being read twice.

As explained above, according to this embodiment, it is possible to easily prevent transaction information from being read twice from a QR code without using a complicated algorithm for preventing the transaction information from being read twice.

The computer programs executed in the portable terminal and the POS terminal according to this embodiment may be provided while being recorded in a computer-readable recording medium such as a CD-ROM, a flexible disk (FD), a CD-R, or a DVD as a file of an installable format or an executable format.

The computer programs executed in the portable terminal and the POS terminal according to this embodiment may be provided while being stored on a computer connected to a network such as the Internet and downloaded through the network. The computer programs executed in the portable terminal and the POS terminal according to this embodiment may be provided or distributed through the network such as the Internet.

Several embodiments of the present invention are explained above. However, the embodiments are presented as examples and are not intended to limit the scope of the invention. The embodiments can be carried out in other various forms. Various omissions, replacements, and changes can be performed without departing from the spirit of the invention. The embodiments are included in the scope and the spirit of the invention and included in inventions described in the scope of claims and the scope of equivalents of the inventions.

Further effects and modifications can be easily derived by those skilled in the art. Therefore, a wider form of the present invention is not limited to the specific details and the representative embodiment represented and described above. Therefore, various changes are possible without departing from the spirit and the scope of the general concept of the invention defined by the appended claims and equivalents of the claims.

What is claimed is:

1. A code reading apparatus comprising:
an image pickup section configured to pick up an image;
a detecting section configured to detect, from the picked-up image, a two-dimensional code obtained by converting information concerning a transaction of a commodity;
a size recognizing section configured to recognize a size of the detected two-dimensional code; and
a reading section configured to read the information from the detected two-dimensional code if the recognized size of the two-dimensional code is different from a size of a two-dimensional code recognized immediately before the recognition of the size of the two-dimensional code in same transaction processing.

2. The apparatus according to claim 1, further comprising a detecting section configured to detect detection omission of the two-dimensional code if sizes recognized by the size recognizing section in the same transaction processing are not continuous.

3. The apparatus according to claim 2, wherein
the detecting section detects, from the picked-up image, a two-dimensional code obtained by converting the information and number information indicating a number of the two-dimensional codes obtained by converting the information,
the reading section reads the number information from the detected two-dimensional code, and
the detecting section detects detection omission of the two-dimensional code if sizes recognized by the size recognizing means in the same transaction processing are not continuous by the number indicated by the read number information.

4. The apparatus according to claim 2, further comprising an informing section configured to inform the detection omission of the two-dimensional code if the detection omission of the two-dimensional code is detected.

5. The apparatus according to claim 1, wherein
the detecting section detects, from the picked-up image, a two-dimensional code obtained by converting, as the information, commodity information of a transaction target commodity, and
the reading section reads the commodity information from the detected two-dimensional code.

6. The apparatus according to claim 1, wherein
the detecting section detects, from the picked-up image, a two-dimensional code obtained by converting, as the information, benefit information of a benefit provided for a transaction of a commodity, and
the reading section reads the benefit information from the detected two-dimensional code.

7. The apparatus according to claim 1, wherein
the detecting section detects, from the picked-up image, a two-dimensional code obtained by converting, as the information, a terminal information of a terminal that converts the information into the two-dimensional code, and
the reading section reads the terminal information from the detected two-dimensional code.

8. A commodity information processing system comprising:
a first reading section configured to read, from a code symbol affixed to a transaction target commodity, commodity information of the commodity;
a converting section configured to convert information concerning a transaction of the commodity indicated by the read commodity information into one two-dimensional code or plural two-dimensional codes having different sizes;
an issuing section configured to issue a receipt on which the converted two-dimensional code is displayed;
an image pickup section configured to pick up an image of the issued receipt;
a detecting section configured to detect the two-dimensional code from the picked-up image;
a size recognizing section configured to recognize a size of the detected two-dimensional code; and
a second reading section configured to read the information from the detected two-dimensional code if the recognized size of the two-dimensional code is different from a size of a two-dimensional code recognized immediately before the recognition of the two-dimensional code in same transaction processing.

9. The commodity information processing system according to claim 8, wherein
the converting section converts the information into one two-dimensional code or plural two-dimensional codes having different sizes, which are QR codes including size versions indicating the sizes of the own codes, the detecting section detects the QR code from the picked-up image, the size recognizing section recognizes a size of a size version included in the detected QR code as a size of the detected QR code, and the second reading section reads the information from the detected QR code if the recognized size of the QR code is different from a size of a QR code recognized immediately before the recognition of the QR code in the same transaction processing.

* * * * *